Patented June 11, 1929.

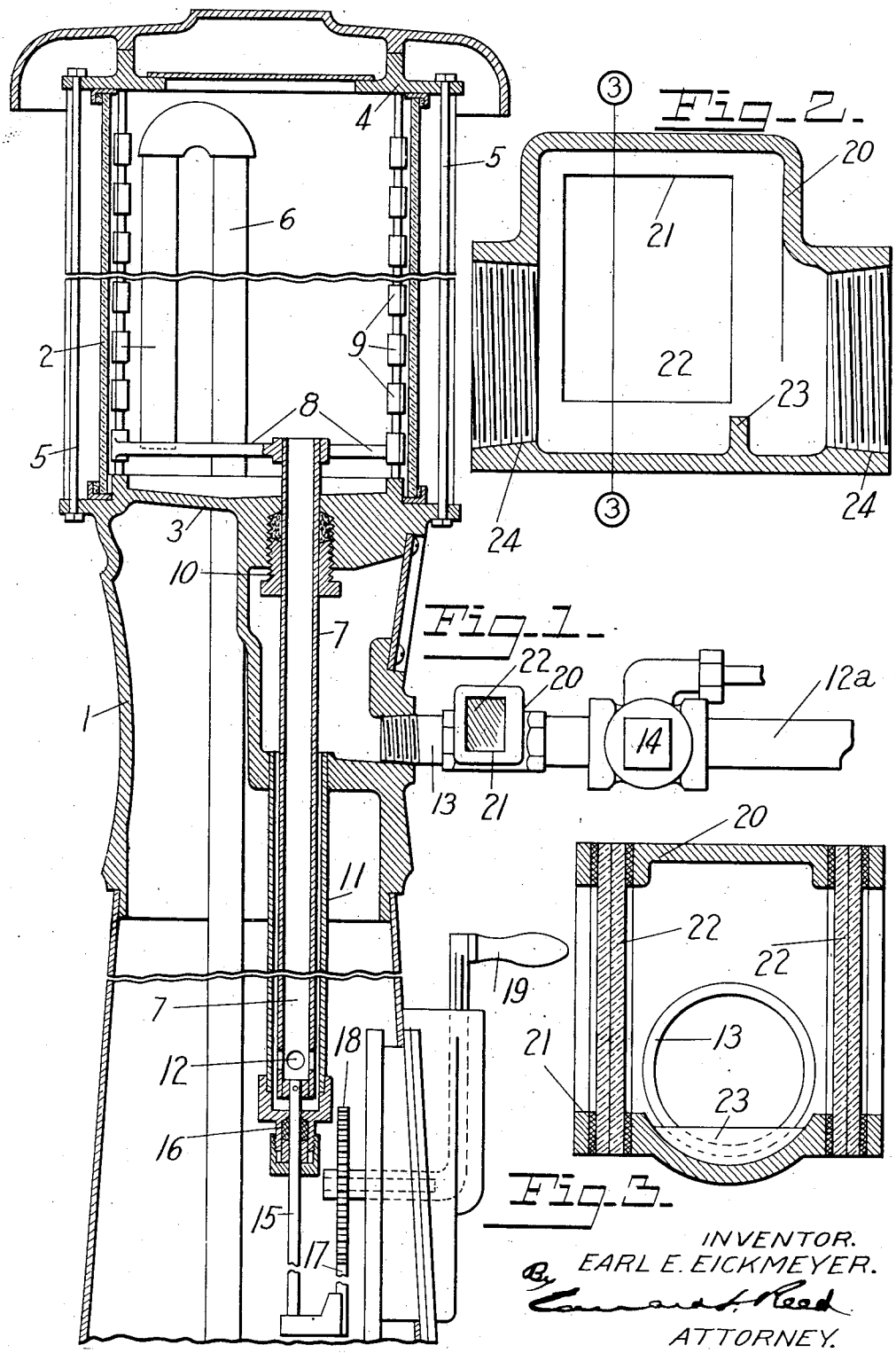

1,717,101

UNITED STATES PATENT OFFICE.

EARL E. EICKMEYER, OF DAYTON, OHIO, ASSIGNOR TO THE NATIONAL RECORDING PUMP COMPANY, OF DAYTON, OHIO, A CORPORATION OF OHIO.

LIQUID-DISPENSING APPARATUS.

Application filed October 19, 1925. Serial No. 63,513.

This invention relates to liquid dispensing apparatus and more particularly to that type of liquid dispensing apparatus shown and described in the application for patent filed by me June 27, 1925, Serial No. 39,986, in which the apparatus is shown as comprising a visible delivery bowl provided with a vertically adjustable discharge pipe. The discharge pipe communicates with the delivery hose and the communication is controlled by a valve.

In the operation of a dispensing apparatus of this character the delivery bowl is filled to capacity with liquid, the adjustable discharge pipe moved to a position which will cause the desired quantity of liquid to flow from the upper portion of the bowl and the valve then opened to permit the delivery of the liquid to the customer. If the valve is closed just as the liquid in the bowl reaches the level of the upper end of the discharge pipe a considerable quantity of liquid, which should be delivered to the customer, is trapped in the discharge pipe and withheld, and as the customer has no way of determining what quantity of liquid is in the discharge pipe he is not aware that he has received short measure. In some kinds of dispensing apparatus the discharge line is so arranged that when the bowl and discharge line is emptied there is a possibility of trapping a considerable quantity of air in the discharge line which would prevent the discharge line from being completely filled prior to the next delivery of liquid and the customer would not receive full measure.

One object of the present invention is to provide such a dispensing apparatus with means for indicating to the customer when the liquid from the discharge pipe has been drained to its normal level and thus insure the delivery of a full measure of liquid.

A further object of the invention is to provide such a dispensing apparatus with means for indicating to the customer the presence of liquid in the discharge line.

A further object of the invention is to provide such an apparatus with a visual indicator which will be simple in its construction and easily installed.

Other objects of the invention will appear as the device is described in detail.

In the accompanying drawings Fig. 1 is a sectional view of the upper portion of a liquid dispensing apparatus embodying my invention; Fig. 2 is a longitudinal sectional view taken centrally through the visual indicator; and Fig. 3 is a transverse sectional view taken on the line 3—3 of Fig. 2.

In these drawings I have illustrated one embodiment of my invention and have shown one form of indicator as applied to a dispensing apparatus of the type shown in the above mentioned application, but it will be understood that this particular embodiment has been chosen for the purpose of illustration only and that the indicator itself may take various forms and may be applied to dispensing apparatus of various kinds.

As here illustrated the dispensing apparatus comprises an upright standard or housing 1 on the upper end of which is mounted a delivery bowl comprising a transparent cylinder 2 confined between a base plate 3, secured to the upper end of the standard 1 and a top plate 4 which engages the upper end of the cylinder and is secured to the base plate by means of rods or elongated bolts 5. The delivery bowl is supplied with liquid by means of a pipe 6 which extends into the bowl and, in the present instance, has its discharge end turned downwardly. This pipe may communicate with a suitable pump which is not here shown. Preferably the bowl is provided with the usual overflow pipe, not here shown, which will drain from the bowl any liquid delivered thereto in excess of its rated capacity which, in the present instance, is ten gallons. Extending into the bowl through the base plate 3 is a vertically adjustable delivery pipe 7 which may be so adjusted that its upper end will be so positioned as to cause the desired quantity of liquid to be withdrawn through the same. In the present construction, the upper end of the discharge pipe is provided with pointers 8 which will operate with indicators 9 to indicate the position of the discharge pipe. The discharge pipe extends downwardly through a suitable stuffing box 10 formed in the bottom of a cavity in the base plate and the lower end of the pipe projects into a well 11 supported by the base plate below the stuffing box, so that it has no communication with the bowl except through the discharge pipe, which is provided at its lower end with openings 12 to permit the liquid to pass therefrom into the well. The well is connected at its upper end with a delivery pipe, such as the usual flexible hose 12ª, and to this end a connecting pipe 13 is mounted in the standard 1 and communicates with the upper end of the well. This connecting pipe is provided with a valve 14 which controls the passage of liquid from the well to the delivery hose. The discharge pipe may be adjusted in any suitable manner but, in the present instance, an actuating rod 15 extends through a stuffing box 16 at the bottom of the well and has connected therewith a toothed rack 17 which meshes with a gear 18 which is actuated by a handle or crank 19.

It will be apparent that if the valve 14 is left open the liquid in the discharge pipe will drain to its normal level, that is, to approximately the upper level of the well 11. However, if the valve is closed after the liquid in the bowl has drained down to the level of the upper end of the pipe the liquid contained in the discharge pipe, above its normal level, will be trapped therein and withheld from the customer. In order that the customer may detect the trapping of a portion of the liquid in the discharge pipe, and resulting in a short measure of liquid delivered to him, I have interposed in the connecting pipe between the valve 14 and the well an indicator or gage which will indicate to the customer when the liquid in the discharge pipe has been drained to its normal level. Preferably this gage is in the form of a visual indicator and is here shown as comprising a housing 20 which is interposed in the connecting pipe 13 and is provided in its opposite side walls with openings 21 closed by transparent walls, such as panes of glass 22. The lower ends of the openings terminate adjacent, to and preferably just above, the level of the liquid in the connecting pipe when the discharge pipe has been drained to its normal level. As here shown the housing is provided with a transverse abutment or d 1 23 which determines the level of the liquid in the housing and the upper edge of which lies just below the bottoms of the openings. Consequently if the liquid in the discharge pipe is not drained to its normal level, that is, if all the liquid which will flow through the delivery hose has not been permitted to drain from the discharge pipe, liquid will be visible in the housing 20, through sight openings, but if the full measure of liquid has been discharged no liquid will be visible through the sight openings of the housing, thus the customer by observing this indicator, may determine whether or not he has received full measure. Obviously by extending the sight openings downwardly they can be so arranged that liquid at a predetermined level will be visible therethrough when the discharge pipe is drained to its normal level, but I prefer that no liquid should be visible at that time.

The sight opening is so arranged with relation to the valve that any material quantity of liquid which is trapped in the rear of the valve will be visible through the sight opening, that is to say, a quantity of liquid in excess of the tolerance allowed by official sealers, which is quite small, cannot be trapped back of the valve without that fact being indicated to the customer. In the arrangement here shown the valve and sight opening are in a substantially horizontal portion of the delivery conduit but this is not essential to the proper operation of the device and any arrangement may be utilized which will cause any material quantity of trapped liquid to be visible through the sight opening. When a substantially horizontal arrangement is used the discharge may be expedited without affecting the indication, by sloping the conduit.

The indicator is very simple in its construction and inexpensive to build. It may be very quickly and easily installed by simply cutting the connecting pipe 13 and interposing the housing between the adjacent ends of the parts of this pipe, the housing being provided with screw threaded openings 24 to receive the ends of the pipe.

While I have shown and described one embodiment of my invention I wish it to be understood that I do not wish to be limited to the details thereof as various modifications may occur to a person skilled in the art.

Having now fully described my invention, what I claim as new and desire to secure by Letters Patent, is:

1. In a liquid dispensing apparatus, a delivery receptacle having an outlet, a delivery conduit connected with said outlet, a valve in said conduit, and a casing interposed in a substantially horizontal portion of said conduit between said outlet and said valve and having openings in the opposite sides thereof and transparent closures for said openings, said openings being so arranged that any liquid remaining in said conduit in the rear of said valve may be observed.

2. In a liquid dispensing apparatus, a delivery receptacle, a delivery conduit communicating with said receptacle and having a substantially horizontal portion, a valve in the horizontal portion of said delivery conduit, said horizontal portion of said delivery conduit having an opening in the side wall thereof between said valve and said receptacle, and a transparent closure for said opening, said opening being so arranged that it will indicate the presence of any liquid in the delivery conduit in the rear of said valve.

3. In a liquid dispensing apparatus, a delivery receptacle, a substantially horizontal delivery conduit leading from said receptacle, a valve in said conduit, said conduit having a sight opening between said receptacle and said valve, a transparent closure for said sight opening, and a dam arranged within said conduit to maintain the liquid at a predetermined level in said conduit when the measured quantity of liquid has been discharged from said receptacle.

4. In a liquid dispensing apparatus comprising a discharge conduit having a substantially horizontal portion and a valve interposed in said discharge conduit to control the flow of liquid through the same, said horizontal portion of said conduit having a sight opening in the rear of said valve and said sight opening being arranged to indicate the presence of liquid in said discharge conduit in the rear of said sight opening.

In testimony whereof, I affix my signature hereto.

EARL E. EICKMEYER.